United States Patent [19]
Cronin

[11] 3,814,832
[45] June 4, 1974

[54] CABLE DRAWN THROUGH POLYMER TUBE WITHIN POLYMER HOUSING FOR ELECTRICAL TRANSMISSION

[75] Inventor: John C. Cronin, Greensburg, Pa.
[73] Assignee: I-T-E Imperial Corporation, Spring House, Pa.
[22] Filed: May 21, 1973
[21] Appl. No.: 362,439

[52] U.S. Cl................ 174/28, 174/36, 174/99 B
[51] Int. Cl. ............................................. H01b 9/04
[58] Field of Search...... 174/16 B, 28, 29, 36, 99 B, 174/127, 129 B, 133 B, 130

[56] References Cited
UNITED STATES PATENTS
2,221,671 11/1940 Cooper.......................... 174/28 X FOREIGN PATENTS OR APPLICATIONS
570,379 7/1945 Great Britain..................... 174/28
1,068,970 5/1967 Great Britain..................... 174/28

Primary Examiner—A. T. Grimley
Attorney, Agent, or Firm—Ostrolenk, Faber, Gerb & Soffen

[57] ABSTRACT

A gas insulated power transmission system having a stranded cable conductor that extends coaxially inside a cylindrical enclosure and through a reinforced plastic tube arranged centrally within the enclosure. The cable is allowed to expand radially so that axial expansion is not needed. Expansion joints may be required for the tube. To provide the optimum dielectric shielding, the tube has a high dielectric constant. The space between the cable and the tube and the space between the tube and the enclosure are filled with an insulating gas, such as $SF_6$.

11 Claims, 7 Drawing Figures

PATENTED JUN 4 1974  3,814,832
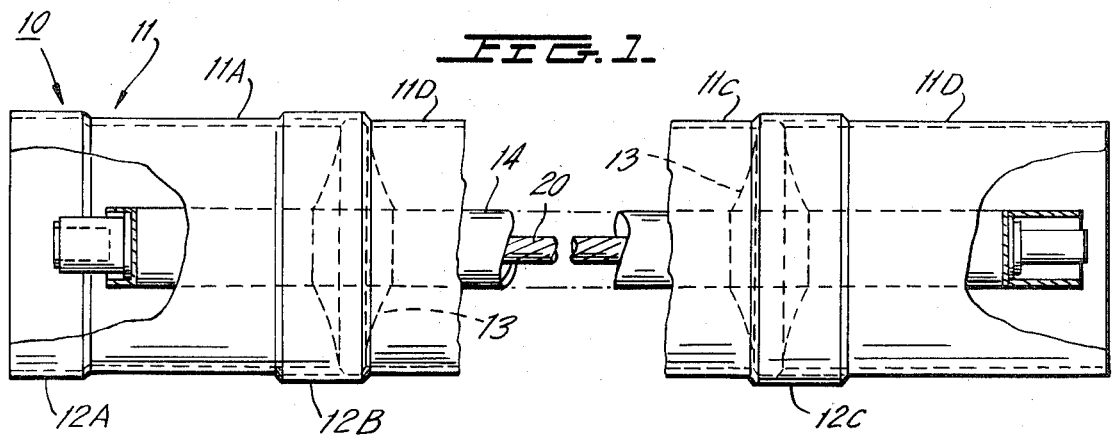
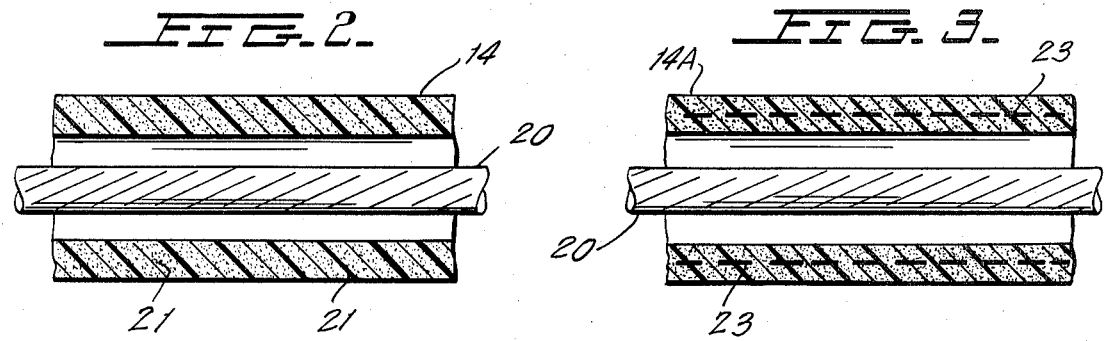
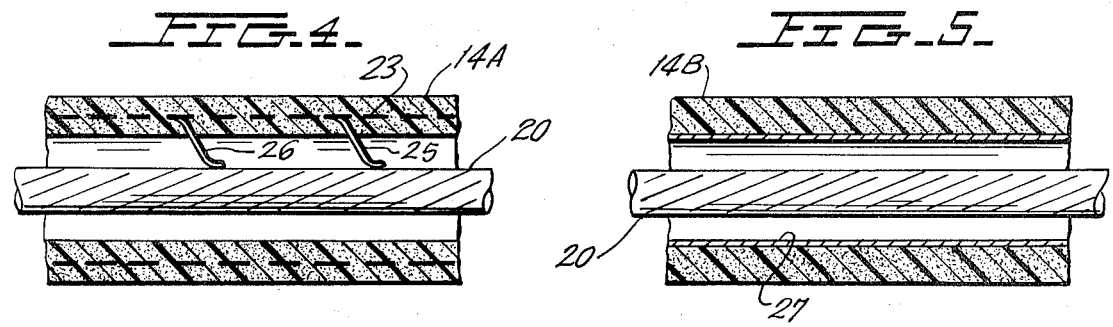
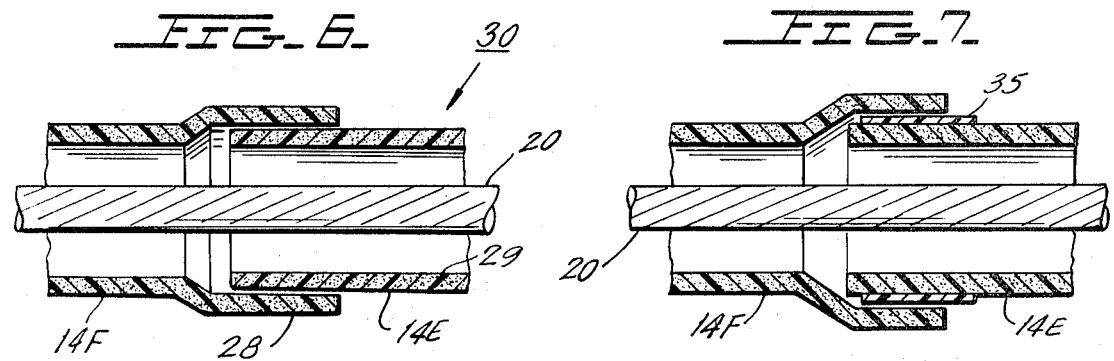

CABLE DRAWN THROUGH POLYMER TUBE WITHIN POLYMER HOUSING FOR ELECTRICAL TRANSMISSION

BACKGROUND OF THE INVENTION

Bus systems as described in U.S. Pat. Nos. 3,546,356 and 3,573,341 assigned to the assignee of the present invention are employed in high voltage power transmission systems in compact substations. In U.S. Pat. No. 3,688,015 also assigned to the assignee of the present invention there is shown the tulip type plug-in contact which must be utilized where a conductor tube is used concentrically within the housing rather than the standard cable of the present invention. Such bus systems typically are comprised of an inner or central conductor concentrically arranged within a conductive housing of circular cross-section in which the spacing is maintained between the conductor and housing by means of suitable insulating spacers arranged at intervals along the bus run.

Since the isolated phase bus is designed to operate at extremely high ratings the bus is preferably filled with a gas such as sulfur hexafluoride ($SF_6$) which has the characteristics of providing high dielectric strength within the bus. A high voltage gradient exists in the gas filled space between the central high voltage conductor and the concentrically arranged grounded conductive conductor housing. The voltage gradient may be of the order of 85 volts per mil or higher for normal operating voltages and as high as 350 volts per mil or more during voltage surges which the system must withstand without flashing over.

Electronegative gases such as $SF_6$ have the ability to absorb free electrons in the gas filled space thereby tending to prevent the electron avalanche type of flashover from occurring at these voltages due to ionization by electron collision. As with other gases, flashover voltage increases with the gas density, i.e. with the number of molecules per unit volume.

Aluminum tubes have been used both for the conductor and the housing. One of the problems in the utilization of such tubes is that since the inner tube or pipe is the basic load current carrying member, the expansion joints which are arranged to permit longitudinal expansion of the inner tube or pipe must be able to carry the current load under all thermal conditions. Hence, the construction of such expansion joints at frequent intervals along the inner central pipe within the conductive housing substantially increases the expense of the structure and also substantially increases the time involved in erecting the structure.

It is therefore an object of the present invention to utilize a flexible wire cable as the central conductor. Such a flexible wire cable may expand radially when subject to thermal forces and such radial expansion will provide an efficient substitute for the expansion joints. The stranded wire cable must of course be supported concentrically within the housing.

For this purpose the present invention contemplates that a central support pipe be used preferably of plastic and preferably so arranged that it will have itself a high dielectric constant, which can be achieved by loading the bonding agent which forms the plastic pipe with a conducting material such as graphite. This conductive component in the pipe wall will also help to suppress partial discharges due to voids in the wall. While the pipe will thus to some extent have a current conductive characteristic, it is essentially a support pipe and hence the joint which may be required between ends of such pipes to allow for thermal expansion need not be of a quality which will permit the passage of high current electric load.

The present invention, therefore, contemplates that the entire structure, including the external housing and the concentrically located pipe, will be erected in a continuous structure having the required length. Thereafter the stranded wire cable will be drawn through the central pipe. In this way a simplified and less expensive construction operation will be provided and the provision to take up any longitudinal thermal expansion will be incorporated.

The primary object of the present invention therefore includes the utilization of a stranded wire cable as the central conductor in an isolated phase bus intended to have an outer housing preferably of aluminum and a central conductor.

A further object of the present invention is the utilization of such stranded wire cable, by reason of the fact that it can expand radially in response to the thermal conditions, to provide means for taking up longitudinal expansion, thereby eliminating the necessity for costly current carrying expansion joints between lengths of a central conductor.

A further object of the present invention is to provide a support pipe for the central wire cable conductor in order to position the same accurately; this support pipe may have appropriate dielectric strength but since it is not carrying the current load, the expansion joints which may be required for the support pipe may be made by the usual pipe connection methods including any sliding arrangement which may be desired between the ends of pipe lengths.

The foregoing and other objects of the present invention will become apparent in the following description and drawings in which:

FIG. 1 is a longitudinal view of an isolated phase bus conductor made in accordance with the present invention.

FIG. 2 is an enlarged view showing the stranded wire cable within the central pipe of the isolated phase bus structure of FIG. 1.

FIG. 3 is a view similar to that of FIG. 2, showing the utilization of a conductive layer at any position in the tube wall to help maintain an equi-potential surface.

FIG. 4 is a view corresponding to that of FIG. 3 showing a modification by which the conductive layer shown in FIG. 3 may be connected to the cable by contact elements.

FIG. 5 is a view showing a conductive layer provided on the inside surface of the cable-carrying tube.

FIG. 6 is a view of two ends of the cable-carrying pipe showing the arrangement thereof to permit sliding of the pipes longitudinally to permit thermal expansion.

FIG. 7 is a view corresponding to that of FIG. 6 showing the same type of expanding joint but with a conductive sleeve between the two pipe ends to prevent the generation of conducting particles if the tube is heavily loaded with conductive elements.

SUMMARY OF THE INVENTION

The present invention utilizes in an insolated phase bus system having a metallic housing such as aluminum and a central conductor a structure in which the central conductor consists of a stranded woven cable for which provision for longitudinal thermal expansion need not be made owing to the fact that one of the characteristics of such a woven cable is that the expansion forces which may be applied thereto can be and are taken up by radial expansion of the cable.

Since the cable must be supported concentrically within the housing, then, instead of using the usual conducting tube requiring expansion joints a simplified supporting tube is used such as a tube of plastic which may be of controlled dielectric strength owing to the incorporation of graphite or other conductive particles in the plastic of the tube when it is formed. This plastic tube is supported within the housing by appropriate insulators so that it remains concentric in the housing.

Since the tube is essentially a support member rather than a current carrying member the expansion joints between successive lengths of tube need not be arranged to carry the heavy current load but need only be mechanically inter-connected so that longitudinal expansion of the tube may occur. The cable, since it is contained by and supported by the tube, is of course in contact with the tube and the tube itself, as well as the space between the tube and the housing.

The tube and the housing may be filled with an insulating gas such as sulfur hexafluoride ($SF_6$) to provide appropriate dielectric conditions. Since the tube, instead of merely having conductive particles incorporated therein in order to create the desired dielectric structure, may have a conductive layer embedded therein connected by contacts to the cable, or the tube may have a conductive paint on the inside which is automatically contacted by the cable. The expansion joints of the tube may, if required by the extent to which the tube itself is made conductive by the inclusion of conductive particles, have a metallic sleeve between the tube ends at each expansion joint to minimize the generation of conductive particles which might otherwise tend to contaminate the insulating gas.

Referring now to FIG. 1 there is here shown an isolated phase bus conductor 10 having a housing 11 consisting of a plurality of housing segments 11A, 11B, 11C, 11D which are joined together at the sleeve joints 12, 12A, 12B, 12C. The housing as previously mentioned is a metallic housing preferably of aluminum and the successive joints at 12A, 12B, 12C are created in a manner now already described in connection with the patents above mentioned to provide a good current conducting path longitudinally from housing section to housing section. In the construction here shown each of the joints is provided with a support member 13, 13 which will serve to support the central tube 14 so that it extends along the axis of the housing.

The tube 14 as previously mentioned is made of a plastic but of course may be made of any appropriate material but should have a high dielectric constant and this can be achieved by loading the bonding agent which may be expoxy or polyester with a conductive material such as graphite. The conductive components in the component of pipe 14 also helps to suppress partial discharges due to voids in the wall.

The woven or stranded cable 20 is drawn through the plastic tube 14 and is supported thereby. The voltage difference between the cable and the tube depends on the conductivity of the tube wall, the capacitance between the cable and the tube and the capacitance between the tube 14 and the enclosure 11. However, since the cable 20 will be in continuous contact with the tube 14 the coupling between the cable 20, and tube 14, is sufficiently high so that voltage differences will be small.

The space between the cable 20 and the tube 14 will be filled with sulfur hexafluoride so that this region also has a high dielectric strength. In fact, the short gap between the cable 20 and the tube 14 should allow higher gradients to be tolerated in this region than in the space between the tube 14 and the enclosure 11. Sulfur hexafluoride will also be carried in the space between the tube 14 and the enclosure 11.

Since the woven or stranded cable 20 has the characteristic that it can expand radially in response to thermal conditions which occur in isolated phase buses of this type no expansion joints are required for the current carrying member 20.

Therefore, the enclosure 11 may be assembled in any length desired with the tubes 14 connected in any manner desired by appropriate methods such as hereinafter described in connection with FIGS. 6 and 7. Then the cable may be drawn through the tube. This obviates the need for segment by segment assembly of expansion contacts between the current carrying members which have previously been used in such isolated phase buses. It therefore facilitates and makes construction less expensive and the structure when assembled may be completed merely by drawing the cable 20 through the tube 14.

In FIG. 2, the cable 20 is shown spaced from the tube 14. This may possibly occur over a very short stretch. Actually the cable 20 will rest on the bottom of the tube 14 having multiple contacts therewith. Owing to the pull which may be exerted in insertion the cable may become slightly twisted and during thermal expansion it may twist further. Therefore, sufficient space is provided within the tube 14 to permit such expansion and possible twisting to occur.

There is indicated very generally in FIG. 2 the utilization of the graphite particles 21 in the material of the tube 14.

If desired as shown in FIG. 3, the tube 14A may be formed with an interior conductive layer 23 therein providing a conductive shield for the cable 20. Also should this be desired, although it will not be essential, the interior conductive layer may have a series of contact members 25, 26 extending therefrom through the material of tube 14 engaging the cable 20, as seen in FIG. 4.

Also, if desired, the tube may as shown in the structure 14B of FIG. 5 be coated with a conductive layer 27 on its inner surface. Since the cable 20 is supported by the tube 14B it will be obvious that there will be many points of contact between the cable 20 and the conductor layer 27.

The various structures shown in FIGS. 3, 4 and 5 may be utilized as desired, where it is possible that some gradient may exist between the cable 20 and the tube wall owing to the fact that the cable when installed may possibly in certain sections be pulled extremely taut and therefore be out of contact with some portions of the wall of the tube 14. This is very unlikely. Since the space between the cable and tube will be filled with $SF_6$ this region also has a high dielectric strength. Therefore, the short gap between cable 20 and tube 14 should allow higher gradients to be tolerated in this region than in the space between the tube 14 and the enclosure 11. Since the capacitative charging current of the system (the cable 20 and the tube 14) will be only approximately 1 to 2 milliamperes per foot, contact between the cable 20 and the tube wall 14 does not have to be very good.

As previously pointed out, during temperature variations the cable 20 is able to expand and contact by changing slightly in diameter or by twisting and deflecting. The tube 14 must also be able to accommodate small changes in length and this is easily provided by having a sliding fit between sections of the tube 14 as shown at 30 of FIG. 6 between tube section 14E and tube section 14F. One end of tube section 14F is spun or flared out to accommodate the external diameter of the other end of a similar tube section 14E so as to form a friction fit therein and maintain the tubes in contact. Since the tubes 14 are longitudinal members virtually all of their effective expansion will be in length and they may therefore slide with respect to each other at the joint 30 of FIG. 6.

Should the tubes 14F and 14E be heavily loaded with conductive elements it may be desirable to fit an insulating sleeve 35 between the flared section 28 of tube 14F and the inserted end 29 of tube 14E to prevent generation of conductive particles. Since the tube joint at 30 does not have to carry current there is no electrical problem in the utilization of the structures shown in FIG. 6 or 7.

During assembly the sections of transmission line are joined by simply telescoping the conductor carrying tubes 14 as shown in FIGS. 6 and 7 and completing the enclosure bond 11 of FIG. 1. At intervals of say several thousand feet the cable is pulled into the conductor tube.

Field assembly becomes simplified because current carrying joints do not have to be made between adjacent sections of transmission line, and there is no need for conductor expansion joints capable of carrying a full load and short circuit currents.

The use of the cable 20 allows skin effect to be reduced by transporting the strands of each segment of the cable.

In the foregoing the invention has been described solely in connection with preferred illustrative embodiments thereof. It is preferred however that the scope of this disclosure be determined not by the specific illustrative embodiments but only by the appended claims.

The embodiments of the invention in which an exclusive privilege or property is claimed are defined as follows:

1. An isolated phase bus conductor structure having:

a metal tubular longitudinal substantially continuous housing;
   a central tube of material having low electrical conductivity; means in said housing supporting said central tube along the axis of said housing; and
   a stranded cable of high electrical conductivity carried within said tube; said tube having an opening therethrough of a first cross section and said cable having a cross sectional width less than said first cross section; said cable having the characteristic of expanding radially and deflecting within said tube in response to increased thermal conditions.

2. The isolated phase bus conductor structure of claim 1 in which said tube and said housing are filled with a dielectric gas.

3. The isolated phase bus conductor structure of claim 2 in which said dielectric gas is sulfur hexafluoride.

4. The isolated phase bus conductor structure of claim 3 in which said central tube is made of electrically nonconductive material.

5. The isolated phase bus conductor structure of claim 4 in which said central tube has conducting material dispersed therein.

6. The isolated phase bus conductor structure of claim 5 in which said conducting material is graphite.

7. The isolated phase bus conductor structure of claim 4 in which said central tube has a conductive layer embedded therein.

8. The isolated phase bus conductor structure of claim 7 in which contacts are provided connected to said conductive layer and extending into the interior of said central tube and engaging said cable.

9. The isolated phase bus conductor structure of claim 4 in which said central tube has a conductive layer on its inner surface.

10. The isolated phase bus conductor structure of claim 4 in which said central tube comprises a plurality of tube lengths, an end of each central tube being received in the adjacent end of the next adjacent central tube and having a sliding fit therein.

11. The isolated phase bus conductor structure of claim 10 in which an insulating sleeve is mounted between said sliding ends of adjacent central tubes.

* * * * *